(No Model.)
R. MARSHALL.
NUT LOCK.
No. 422,027.   Patented Feb. 25, 1890.
Fig. 1.
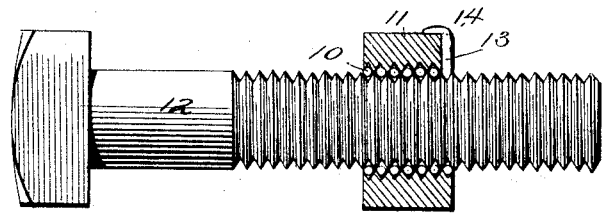
Fig. 2.   Fig. 3.
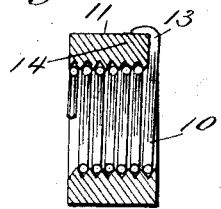   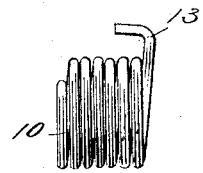
Fig. 4.
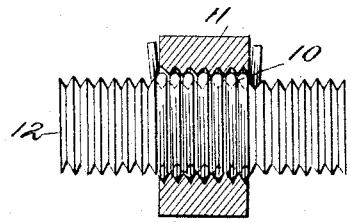
WITNESSES:
W. R. Davis
C. Sedgwick
INVENTOR
R. Marshall
BY Munn & Co.
ATTORNEY

UNITED STATES PATENT OFFICE.

ROBERT MARSHALL, OF LONDON, ENGLAND, ASSIGNOR OF ONE-HALF TO CHARLES M. JACOBS, OF SAME PLACE.

NUT-LOCK.

SPECIFICATION forming part of Letters Patent No. 422,027, dated February 25, 1890.

Application filed March 26, 1889. Serial No. 304,810. (No model.) Patented in England December 7, 1888, No. 17,295.

*To all whom it may concern:*

Be it known that I, ROBERT MARSHALL, engineer, of 121 Fenchurch Street, in the city of London, England, have invented a new and Improved Nut-Lock, (for which a patent has been granted in Great Britain, dated December 7, 1888, and numbered 17,295,) of which the following is a full, clear, and exact description.

My invention relates to an improvement in nut-locks, and has for its object to simplify the construction of the same and provide a means whereby the nut may be freely screwed upon a threaded bolt of any description, but which when brought to place cannot be loosened upon or unscrewed from the bolt except by exerting excessive strain directly upon the nut itself through the medium of a powerful wrench or equivalent lever.

The invention consists in inserting within the threaded bore of a nut a helix of wire, as will be hereinafter fully set forth, and pointed out in the claims.

Reference is to be had to the accompanying drawings, forming a part of this specification, in which similar figures of reference indicate corresponding parts in all the views.

Figure 1 is a transverse section through the improved nut, illustrating the same in position upon a bolt. Fig. 2 is a section through the nut detached, illustrating one end of the coil as secured to the nut. Fig. 3 is a side elevation of the detached coil; and Fig. 4 is a sectional view of the nut, illustrating the coil or helix as simply inserted in the nut and unattached thereto.

In carrying out the invention a helix of wire 10 is formed the depth of the nut 11, into which it is to be introduced, and produced with a pitch corresponding with that of the bolt 12, adapted to receive the nut. The interior of the nut is threaded to correspond with the outside diameter of the helix, in order that the said helix may be readily screwed into the nut, as shown in Figs. 1, 2, and 4. One end 13 of the wire constituting the helix is ordinarily secured to the nut by being projected beyond the latter and turned down into a suitable groove 14, as best shown in Figs. 1 and 2, which groove is preferably produced in the outer face of the nut. When the nut thus bushed by the wire helix is screwed upon the bolt, the direction of motion through friction tends to enlarge the diameter of the helical coil, whereby the nut is permitted to turn freely upon the bolt; but when the nut is turned or pressed in the opposite direction the wire bushing is wound tightly around the bolt, forming an effectual lock. It is obvious that the same effect may be produced by fixing one end of the helix to the bolt instead of to the nut.

In order to obtain the greatest possible strength, I prefer to use for the construction of the helical coils a wire diamond-shaped in cross-section when the nuts and bolts are provided with V-threads, and the cross-section of the wire is varied according to the form of threads employed—as, for instance, square cross-section for square threads and round cross-section for round threads; but when strength is not so much an object I prefer to use what is ordinarily known as "round wire."

The wire is preferably hard drawn, of the quality used for making springs.

In Fig. 4 I have illustrated the end of the helical coil as simply carried outward and unattached to the nut, and I desire to be distinctly understood that it is not actually necessary to secure the helix to the nut in any other manner than by frictional contact with the threads.

It is not necessary that the thread of the nut-bore be continuous, as the threads may be broken, or the walls of the bore may be spirally serrated.

I am aware that heretofore it has been proposed to form a nut with a chamber in the under side to inclose a short coil of spiral spring placed loosely in said chamber, the spring being fitted to run upon the thread of the bolt and adapted to contract upon the same, so as to resist any attempt to unscrew or loosen the nut. There are material and important distinctions between this device and my improved nut-lock. It is an essential feature of the latter that the threads of the nut are bushed by the wire spring, whereas in the former the nut is threaded to fit the bolt like any ordinary nut, and the spring is a separate and detachable part. In my nut-lock every thread of the nut resists the tendency to unscrew, or, in other words, the entire holding force of the nut opposes loosening and back motion. In the prior device there is difficulty in entering the spring upon the bolt, and moreover, as the spring is not attached to the nut in any way, it is likely to become separated and lost. These objections do not apply to my device, as the spring lies in a groove of the nut and forms a permanent part of the same. It will be understood, therefore, that I do not claim, broadly, the combination of a nut with a helical spring for preventing back motion of the nut; but What I do claim, and desire to secure by Letters Patent, is—

1. The combination, with a nut having a helically-grooved bore, of a helical spring lying in the groove and forming the thread of the nut, substantially as described.

2. The combination of a nut having an internal thread, and a helical spring forming a bushing to the threads of said nut and extending through the same, one end of said spring being fastened to the nut and the other left free or unattached, substantially as described.

ROB. MARSHALL.

Witnesses:
    EDMUND J. MOFFAT,
        12 *St. Helen's Place, E. C.*
    JULIUS O. JACOBS,
        16 *St. Helen's Place, E. C.*